United States Patent [19]

Takada et al.

[11] Patent Number: 4,943,128
[45] Date of Patent: Jul. 24, 1990

[54] LIGHT SCANNING DEVICE

[75] Inventors: Hiromi Takada; Takami Suzuki, both of Yokohama; Toshio Shiina, Kawasaki; Keiji Okamoto; Takeshi Komurasaki, both of Yokohama; Satoru Yoshioka, Kamakura; Nobuo Sakuma, Inagi; Tadashi Matsuura, Yokohama, all of Japan

[73] Assignee: Ricoh Company, Ltd., Tokyo, Japan

[21] Appl. No.: 113,668

[22] Filed: Oct. 28, 1987

[30] Foreign Application Priority Data

| Oct. 28, 1986 | [JP] | Japan | 61-256133 |
| Jun. 5, 1987 | [JP] | Japan | 62-141120 |
| Jun. 5, 1987 | [JP] | Japan | 62-141121 |
| Jun. 9, 1987 | [JP] | Japan | 62-143510 |
| Jun. 10, 1987 | [JP] | Japan | 62-144588 |
| Jun. 30, 1987 | [JP] | Japan | 62-163695 |
| Aug. 7, 1987 | [JP] | Japan | 62-197338 |
| Aug. 7, 1987 | [JP] | Japan | 62-197339 |

[51] Int. Cl.$^5$ .................................................. G02B 26/10
[52] U.S. Cl. ........................................ 350/6.9; 350/6.5
[58] Field of Search ............... 350/6.9, 6.5, 6.6, 6.7, 350/6.8, 484, 486, 6.1; 358/206

[56] References Cited

U.S. PATENT DOCUMENTS

| 4,076,372 | 2/1978 | Pole et al. | 350/6.9 |
| 4,161,366 | 7/1979 | Bol et al. | 350/6.9 |
| 4,568,182 | 2/1986 | Modjallal | 350/6.9 |
| 4,662,708 | 5/1987 | Bagdal | 350/6.9 |

FOREIGN PATENT DOCUMENTS 0146214 8/1985 Japan ........................... 350/6.5

OTHER PUBLICATIONS

Xerox Disclosure Journal, vol. 8, No. 6, Nov./Dec. 1983, pp. 467–468.
IBM Technical Disclosure Bulletin, vol. 26, No. 1, Jun. 1983, pp. 29–31.
IEEE, Aug. 1979, Performance Improvements in Laser Beam Recorders by Robert K. Peterson.

Primary Examiner—Bruce Y. Arnold
Assistant Examiner—Ronald M. Kachmarik
Attorney, Agent, or Firm—Oblon, Spivak, McClelland, Maier & Neustadt

[57] ABSTRACT

A mirror surface for deflecting an incident light beam is inclined to the axis of rotation and rotated for scanning the light beam. The incident light beam is applied to the mirror surface along the axis of rotation, and a reflected light beam is continuously deflected by the rotating mirror surface to scan a surface. When the incident light beam has an elliptical cross section in a direction normal to its optical axis, the cross-sectional shape of the reflected light beam varies due to the inclination of the mirror surface in response to rotation of the mirror surface. The varying shape of the reflected light beam obstructs proper reading and writing of an image with a light scanning device employing the above mirror surface. To avoid this problem, light beam shapers are provided in positions before and after the light beam is reflected by the mirror surface.

16 Claims, 16 Drawing Sheets

F I G. 4
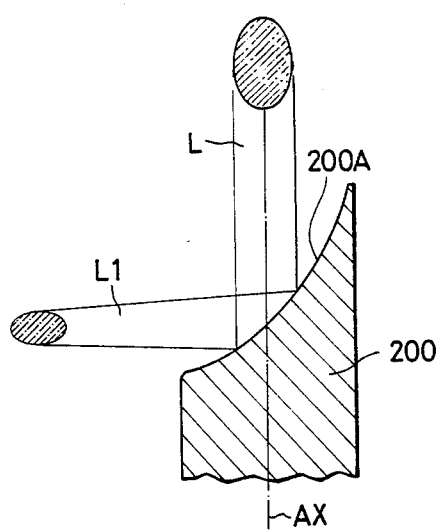
F I G. 5
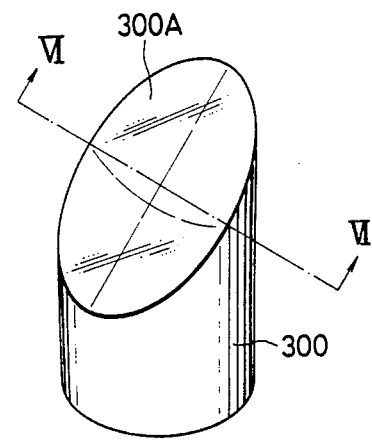
F I G. 6
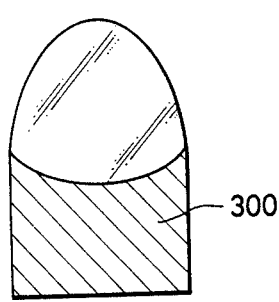
F I G. 7
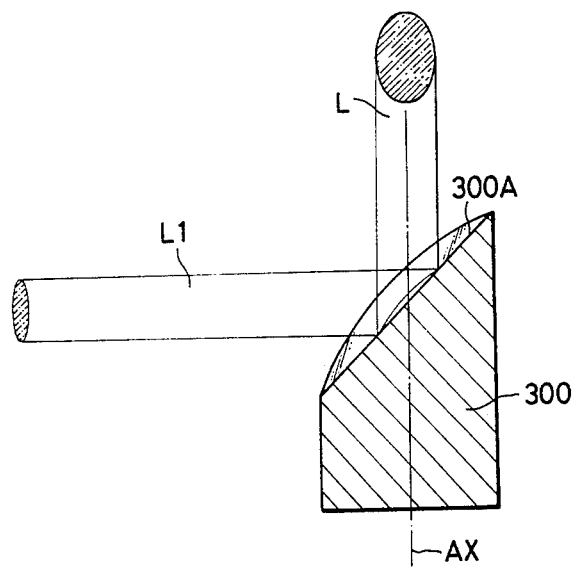

F I G. 39
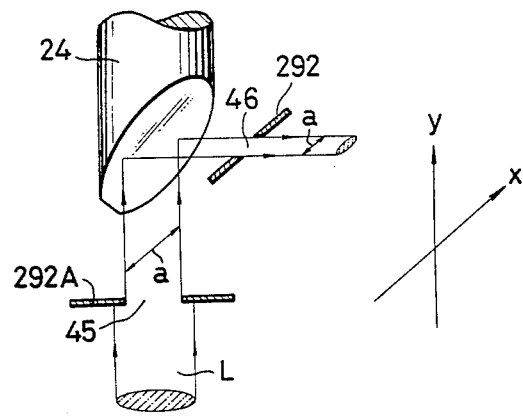
F I G. 40
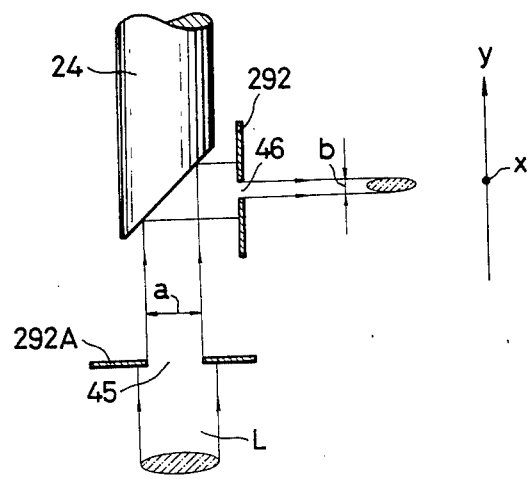

LIGHT SCANNING DEVICE

BACKGROUND OF THE INVENTION

The present invention relates to a light scanning device.

Known light beam deflecting means include a rotating polygonal mirror and a hologram scanner. While the polygonal mirror or the hologram scanner is making one revolution, the light beam is deflected a plurality of times by a plurality of mirror surfaces or hologram gratings. Since light beam deflection is effected by such mirror surfaces or hologram gratings in the polygonal mirror or the hologram scanner, these known light beam deflectors have suffered the problem of irregular deflecting surfaces which do not lie parallel to each other. To correct such irregular reflecting surfaces, a complex optical system has to be incorporated or the reflecting surfaces of the polygonal mirror have to be fabricated with high precision.

In view of the above drawback, there has been proposed a scanning means comprising a rotatable reflecting medium having a mirror surface or surfaces which are inclined with respect to the axis of rotation of the rotatable reflecting medium. A light beam to be deflected is applied along the axis of rotation of the rotatable reflecting medium to the mirror surface or surfaces, which are rotated to deflect the reflected light beam. The mirror surface or surfaces in the scanning means are disclosed in:

(i) Xerox Disclosure Journal, Volume 8, Number 6, November/December 1983, (ii) SPIE, Vol. 200, Laser Recording and Information Handling (1979)/119.

In the disclosed arrangements, only one or two mirror surfaces are employed, and such a few mirror surfaces can easily be fabricated. No problem of irregular, out-of-parallel reflecting surfaces is experienced by a single mirror surface.

No difficulty arises if a light beam applied to a mirror surface is of a circular cross-sectional shape. However, if the cross-sectional shape of an applied light beam is not circular, but elliptical, for example, the cross-sectional shape of the reflected light beam necessarily varies in the directions of the major and minor axes of the elliptical shape dependent on the angular position of the mirror surface.

When a mirror surface inclined at 45°, for example, to the axis or rotation is rotated, the reflected beam appears as if rotated for each of illuminated positions on the surface being scanned in a main scanning direction. In the position where the mirror surface has rotated 90°, the major and minor axes of the elliptical shape are positionally inverted or switched around between the main and auxiliary scanning directions.

Where a light scanning device is composed of such a scanning means having a mirror surface or surfaces and a semiconductor laser as a light source, a light beam of an elliptical cross section is emitted from the semiconductor laser since the light beam diverges at different angles in the direction of a junction surface and a direction normal to that direction. As the elliptical light beam cannot easily be corrected even by a lens, a prism, or the like, the diameter of a final beam spot on a surface being scanned becomes irregular, and hence the quality of images reproduced by a write system such as a printer may be lowered.

A laser printer has a focusing optical system including an $f\theta$ lens, a toroidal lens, and the like and disposed in the path of an emitted light beam. The diameter of a focused light beam is usually determined by the diameter of a light beam applied to these lenses.

Inasmuch as the beam applied to the lenses has different diameters in the main and auxiliary scanning directions, the final beam spot on a surface being scanned is of different diameters in the main and auxiliary scanning directions.

In a beam scanning device in which an elliptical light beam is deflected by being applied to a mirror surface at a certain finite angle to a direction normal to the mirror surface, especially where incident and reflecting angles are about 45°, the elliptical light beam being deflected is scanned while being rotated upon rotation of the mirror surface, and the spot diameter of the converged light beam focused by a focusing lens on a surface being scanned varies in the main and auxiliary scanning directions, thus adversely affecting the image quality.

SUMMARY OF THE INVENTION

It is therefore an object of the present invention to provide a light scanning device for deflecting an elliptical light beam so that the spot diameter on a surface being scanned remains unchanged in main and auxiliary scanning directions, while the relationship of incident and reflecting angles with respect to a mirror surface remains unchanged.

To achieve the above object, a light scanning device has a shaping means for shaping a light beam and sending the shaped light beam to a surface being scanned so that the shape of the beam on the surface being scanned will remain unchanged irrespective of how a mirror surface may be rotated.

With the present invention, the number of mirror surfaces is reduced to the extent that any concern or consideration about mirror surface accuracy such as irregular, out-of-parallel mirror surfaces with respect to the axis of rotation can greatly be reduced. Therefore, the light scanning device can be molded of synthetic resin in a single operation, and a semiconductor laser may be employed as a light source. As a result, the light scanning device can be manufactured inexpensively and reduced in size.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 4 is a cross-sectional view of a unigon mirror having a concave cylindrical mirror surface;

FIG. 5 is a perspective view of another unigon mirror having a concave cylindrical mirror surface;

FIG. 6 is a cross-sectional view taken along line VI—VI of FIG. 5;

FIG. 7 is a view showing light beams applied to and reflected by the unigon mirror shown in FIG. 5;

FIG. 39 is view showing how the light beam is deflected when the reflecting surface is in a certain angular position in FIG. 38;

FIG. 40 is a side elevational view of FIG. 40;

DESCRIPTION OF THE PREFERRED EMBODIMENTS

There is proposed a deflecting means in which a light beam to be deflected is applied along an axis of rotation to a mirror surface of a rotatable reflecting medium, which is inclined to the axis of rotation, and is reflected by the mirror surface, the reflected light beam being deflected 360° by rotation of the reflecting medium.

The reflecting medium which has a single mirror surface is referred to as a unigon mirror.

In a deflecting system employing such a unigon mirror, only one mirror surface is involved in deflecting a light beam. Therefore, the problem of irregular, out-of-parallel mirror surfaces is solved in principle by such a deflecting system.

The present invention is applicable to not only a unigon mirror having a single mirror surface, but also a mirror having a plurality of mirror surfaces. However, unigon mirrors will be described in the following embodiments as they can be manufactured with advantages.

As described above, a unigon mirror is a reflecting medium which has a mirror surface inclined to the axis of rotation for reflecting a light beam applied thereto along the axis of rotation to deflect the reflected light beam upon rotation of the unigon mirror.

The mirror surface of a unigon mirror to which the present invention is applied may be a flat, concave spherical, or cylindrical concave surface. Since a unigon mirror having a flat mirror surface is generally known, unigon mirrors having concave spherical and cylindrical concave mirror surfaces will hereinafter be described.

A cylindrical concave surface is a concave surface which has no curvature in a certain direction, and is typically represented by an inner peripheral surface of a hollow cylinder having a circular cross section.

A concave spherical or cylindrical concave mirror surface is capable of converging the reflected light beam in at least one direction.

Specific embodiments will now be described with reference to the drawings.

Figure 1:
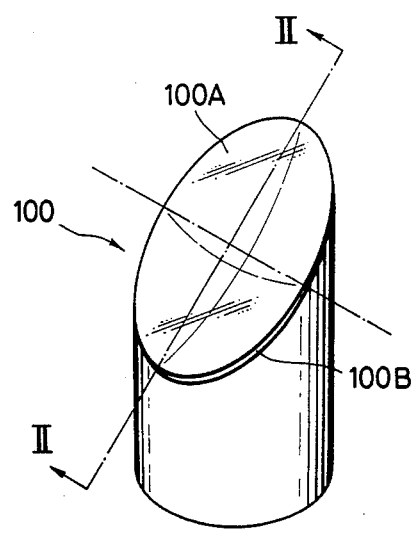
FIG. 1 is a perspective view of a unigon mirror having a concave spherical mirror surface.

A unigon mirror 100 shown in FIG. 1 has a concave spherical mirror surface 100A having a beveled peripheral edge 100B.

Figure 2:
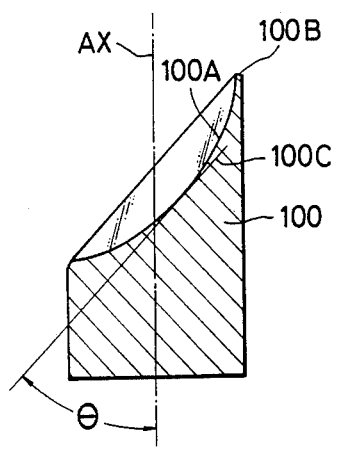
FIG. 2 is a cross-sectional view taken along line II—II of FIG. 1.

In FIG. 2 which is a cross-sectional view taken along line II—II of FIG. 1, the reference letters AX indicates the axis of rotation of the unigon mirror 100. The axis of rotation AX and the concave spherical surface 100A intersect at a point where a plane 100C tangential to the concave spherical surface 100A is inclined 45° (which is the angle $\theta$ in FIG. 2) to the axis of rotation AX. The angle $\theta$ is not necessarily limited to 45°.

Figure 3:
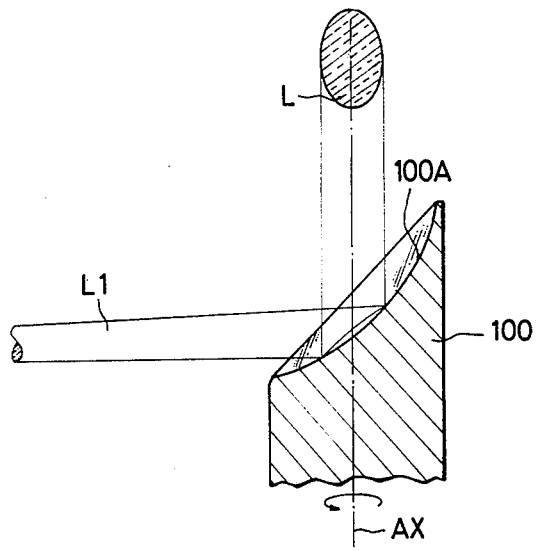
FIG. 3 is a view showing light beams applied to and reflected by the unigon mirror shown in FIG. 2.

As shown in FIG. 3, when an incident light beam L is applied along the axis of rotation AX, i.e., the principal ray of the incident light beam L is applied in alignment with the axis of rotation AX, a reflected beam L1 is produced by the mirror surface 100A.

As the unigon mirror 100 rotates, the reflected light beam L1 is deflected around the axis of rotation AX. The axis of rotation AX and the reflected light beam L1 form 90° therebetween.

If the incident light beam L is a parallel-ray beam, the reflected light beam L1 is converged toward a surface (not shown) to be scanned, by the concave spherical mirror surface 100A. The degree to which the reflected light beam is converged is determined dependent on the radius of curvature of the concave spherical mirror surface. Where the focal depth in focusing the light beam with the concave spherical mirror surface is sufficiently large, the shape of a scanning beam spot on the surface being scanned can approximately be uniformized.

Where the incident light beam L is a laser beam, it tends to be slightly divergent as difficulty is experienced in making the rays of the laser beam parallel. However, the reflected beam can be made divergent as required through adjustment of the focusing capability of the concave spherical mirror surface 100A.

With a unigon mirror having a flat mirror surface, if the inclination of the mirror surface with respect to the axis of rotation is different from the designed degree of inclination, then the reflected light beam is not directed in a proper direction and no appropriate light scanning is made possible. Therefore, when such a unigon mirror is mounted on a drive system, high accuracy is needed to position the unigon mirror.

Where the mirror surface is a concave spherical surface as illustrated, the inclination of the plane tangential to the concave spherical surface at the intersection between the axis of rotation and the concave spherical surface varies only slightly even if there is a small degree of inclination between the axis of the unigon mirror and the axis of rotation. Therefore, no high accuracy is necessary in mounting the unigon mirror 100 on the rotative drive system, and the direction of the light beam reflected by the unigon mirror 100 can easily be corrected.

FIG. 4 shows a unigon mirror 200 having a cylindrical concave mirror surface 200A which has no curvature in a direction normal to the sheet of FIG. 4. A plane tangential to the cylindrical concave mirror surface 200A at the intersection between the axis of rotation AX and the concave mirror surface is inclined at 45° to the axis of rotation AX. Stated otherwise, a line normal to the plane tangential to the cylindrical concave mirror surface 200A at the intersection crosses the axis of rotation AX at 45°. However, the angle of inclination is not limited to 45°.

When an incident light beam L of a circular cross section is applied along the axis of rotation AX, a reflected light beam L1 is converged in one direction (vertical direction in FIG. 4).

In the embodiment of FIG. 4, the unigon mirror can easily be positioned, and the direction of the reflected mirror can easily be corrected.

FIG. 5 illustrates a unigon mirror 300 having a cylindrical concave mirror surface 300A. The cylindrical concave mirror surface 300A has no curvature in a direction inclined 45° to the axis of rotation AX as shown in FIG. 7 (which is a cross-sectional view of the unigon mirror 300 taken along a symmetric plane including the axis of rotation AX). As shown in FIG. 6 which is taken along line VI—VI of FIG. 5, the mirror surface is concave in a cross-sectional plane including the axis of rotation AX and normal to the symmetric plane. The angle of inclination is however not limited to 45°.

When an incident light beam L of a circular cross section is applied along the axis of rotation AX, as shown in FIG. 7, a reflected light beam L1 is produced in a direction normal to the axis of rotation AX and converged in a direction normal to the sheet of FIG. 7 by the cylindrical concave surface.

In both of the embodiments shown in FIGS. 4 and 5, the reflected light beam L1 is deflected by rotation of the unigon mirrors 200, 300.

For deflecting the light beam with the unigon mirror, the unigon mirror must be rotated.

To rotate the unigon mirror, the unigon mirror should be mounted on a rotative drive system. The rotative drive system may basically be any rotative drive system. Arrangements which simplify the relationship between rotative drive systems and unigon mirrors will hereinafter be described.

In order to simplify the relationship between a rotative drive system and a unigon mirror, the unigon mirror should be integral with the drive shaft of a motor which constitutes the rotative drive system. The axis of rotation is therefore the axis of the rotatable drive shaft of the motor.

The unigon mirror may be made integral with the rotatable drive shaft of the motor by fixing the unigon mirror to the drive shaft or shaping the drive shaft into a unigon mirror.

Figure 8:
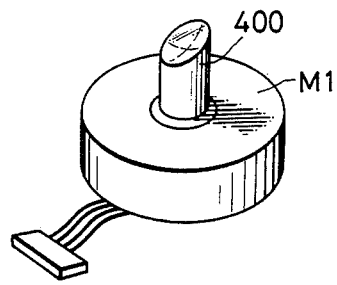
FIGS. 8 through 12 are perspective views illustrating various forms by which unigon mirrors and motors are coupled.

FIG. 8 shows a motor M1 having a rotatable drive shaft 400 which is shaped into a unigon mirror.

Figure 9:
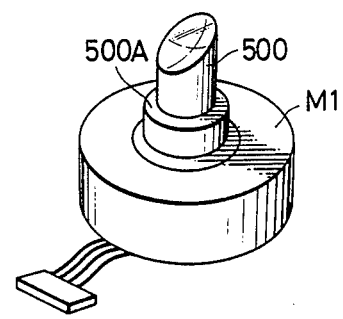

FIG. 9 also shows a motor M1 having a rotatable drive shaft shaped into a unigon mirror. In this embodiment, moreover, there is a step 500A between the portion of the drive shaft 500 which is shaped into the unigon mirror and a portion of the drive shaft which leads to the bearing of the motor. When the drive shaft 500 is fitted into the bearing, a required pushing force may be applied to the step 500A. Therefore, the motor can be assembled with ease without damaging the mirror surface of the mirror surface.

Figure 10:
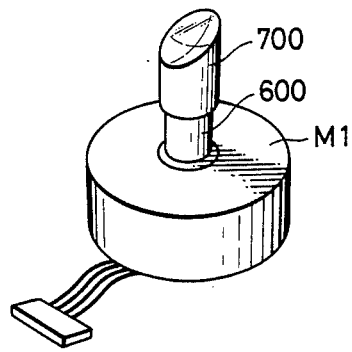

According to an embodiment shown in FIG. 10, a prefabricated unigon mirror 700 is integrally fixed to the distal end of a rotatable drive shaft 600 of a motor M1. The unigon mirror 700 may be fixed to the drive shaft 600 by being forced, bonded, a pin, or any of known fixing means.

Figure 12:
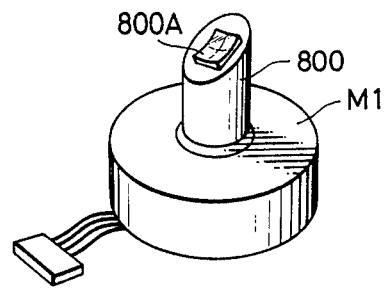

In an embodiment shown in FIG. 12, the distal end of a rotatable drive shaft 800 of a motor M1 is beveled at 45° with respect to the axis of rotation, and a mirror surface body 800A having a concave spherical mirror surface or a cylindrical concave mirror surface is fixed to the slanted surface of the drive shaft 800. The drive shaft 800 and the mirror surface body 800A jointly constitute a unigon mirror.

In the embodiments shown in FIGS. 8, 9, 10, and 12, since the relationship between the rotative drive system and the unigon mirror is simplified, the unigon mirror is positioned with high accuracy, and the cost is lowered.

In the embodiments shown in FIGS. 8, 9, 10, and 12, the relationship between the rotative drive system and the unigon mirror is simplified. This is applicable to not only a unigon mirror having a concave mirror surface but also a unigon mirror having a flat mirror surface.

The unigon mirror may be in the form of a metal or plastic body which is processed to have a mirror surface. The unigon mirror may be formed by shaping the rotatable drive shaft of a motor as shown in FIGS. 8 and 9, or the unigon mirror may be fixed to the rotatable drive shaft of a motor as shown in FIG. 10.

Where the unigon mirror 700 is fixedly mounted on the rotatable drive shaft according to the embodiment of FIG. 10, the unigon mirror 700 is preferably formed of an aluminum-base material since its mirror surface portion can be processed to a mirror finish by ultrahigh precision machining.

Figure 11:
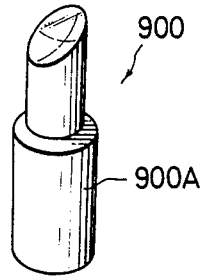

The unigon mirror 700 may be formed of a coppper-base material. In this case, however, aluminum should be deposited by evaporation on a portion to be turned into a mirror surface, and a protective film should be formed on the aluminum layer.

Where the rotatable drive shaft of the motor is machined into the unigon mirror as shown in FIGS. 8 and 9, the drive shaft itself is made of an aluminum-base material so that a mirror surface can be formed solely by ultrahigh precision processing. If the drive shaft itself is made of an aluminum-base material, a portion 900A (FIG. 11) of a rotatable drive shaft 900 which contacts a bearing should be hardened by a hard alumite layer so as to give a sufficient degree of hardness to the portion 900A.

If the rotatable drive shaft is made of a coppper-base material or a known material such as SUS in case the rotatable drive shaft of the motor is machined into the unigon mirror, a mirror surface should be formed by evaporating aluminum and then providing a protective film on the aluminum layer.

A shaft of SUS or the like may be shaped into one having a reflecting surface by transferring a metallic reflecting surface by a stamping process which is employed in fabricating optical discs or the like.

Any material which has a reflectivity of 85% or higher with respect to a write laser beam may be used.

Figure 13:
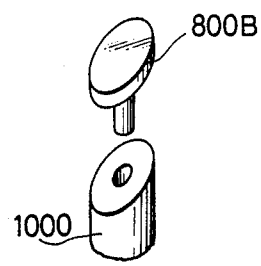
FIGS. 13 through 15 are views of different mirror surface bodies of unigon mirrors.
Figure 14:
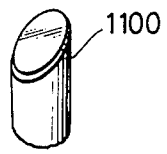

FIG. 13 shows an embodiment which is a modification of the embodiment of FIG. 12. In FIG. 13, a mirror surface body 800B is fitted in a rotatable drive shaft 1000.

If a burr is produced on an end of a mirror surface which is machined by a cutter blade, when a laser beam runs across the reflecting surface, an irregular reflection is caused by the burr, and may disturb an optical protected image.

To avoid this problem, the peripheral edge of the mirror is beveled at 1100 for preventing such an irregular reflection.

Figure 15:
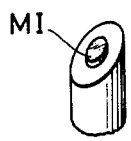

In another embodiment shown in FIG. 15, only a portion of a slanted surface of a motor shaft is processed into a mirror surface.

When a motor shaft having a mirror finish is combined with a motor, the motor shaft is inserted into bearings with a degree of fitting ranging from H7 to G7. At this time, a portion of the reflecting surface may be deformed accidentally.

Figure 16:
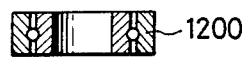
FIG. 16 is a view explaining the direction in which a motor drive shaft is inserted into bearings.
Figure 16:

This drawback may be overcome by making the diameter d (FIG. 16) of a shaft portion having a mirror smaller than the diameter of bearings 1200, and fitting the shaft portion having a mirror finish into the bearings 1200, as shown in FIG. 16.

A laser printer as an example of an apparatus in which a light scanning device employing a unigon mirror is incorporated will now be described below.

Figure 17:
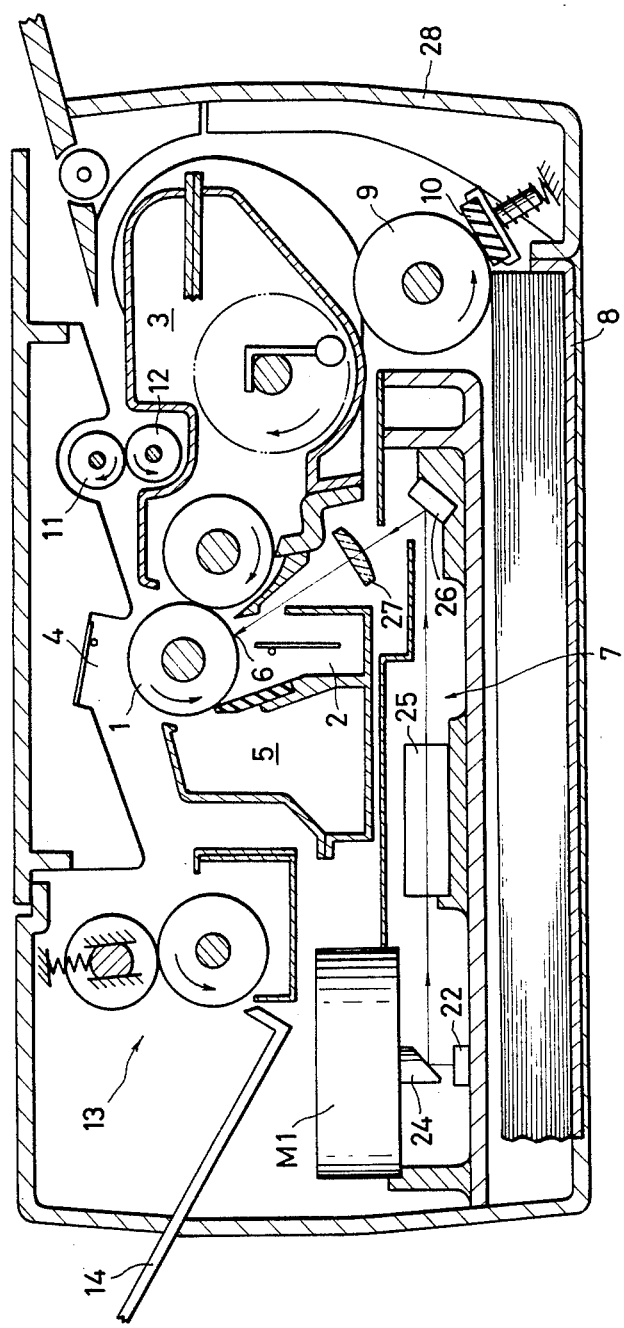
FIG. 17 is a cross-sectional view of a laser printer in which the present invention can be incorporated.

FIG. 17 shows a laser printer in which the present invention is incorporated.

Around a photosensitive drum 1 having a surface to be scanned, there are disposed a charging unit 2, a developing unit 3, a transfer charger 4, and a cleaning unit 5 which are successively arranged in the direction of rotated indicated by the arrow. An optical write unit 7 is provided for applying a write light beam to the photosensitive drum 1 at a position 6 between the charging unit 2 and the developing unit 3.

The light scanning device according to the present invention is disposed in the write optical unit 7.

In the following description, however, a light scanning device prior to the present invention is first described, and then a light scanning device of the present invention in which a shaping means is added to a unigon mirror is described.

The charging unit 2 and the write position 6 are disposed below the photosensitive drum 6, and the optical write unit 7 is positioned downwardly of the photosensitive drum 1, the developing unit 3, and the cleaning unit 5. The transfer charger 4 is disposed above the photosensitive drum 1. A transfer area between the transfer charger 4 and the photosensitive drum 1 is supplied with a transfer sheet from a sheet cassette 8 disposed below the optical write unit 7. Transfer sheets are separated and fed, one by one, from the sheet cassette 8 by a feed roller 9 and a friction pad 10 pressed thereagainst. The transfer sheet thus fed out is then turned back on one side of the developing unit 3, and supplied to the transfer area while being registered with an image on the photosensitive drum 1 by a pair of resist rollers 11, 12 above the developing unit 3. A fixing unit 13 is disposed in a path which the sheet after the image has been transferred thereto follows. A sheet tray 14 is positioned downstream of the fixing unit 13.

Figure 18:
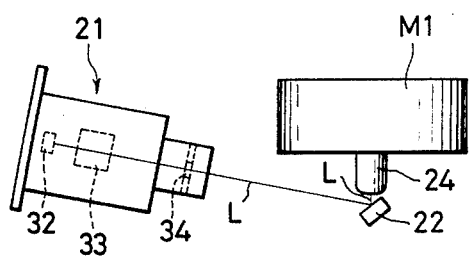
FIG. 18 is a view of a laser unit.

A central portion of the optical write unit 7 is shown in FIG. 18. A light beam emitted by a laser unit 21 and flickering in response to an image information signal applied is reflected by a first mirror, and applied to a unigon mirror 24 integrally attached to the shaft of a motor M1, which is rotated to deflect the light beam repeatedly in a given angular range.

The unigon mirror 24 may have a concave mirror surface or a flat mirror surface.

A reflected light beam (deflected light beam) from the unigon mirror 24 is corrected by an $f\theta$ lens 25 so that the light beam is linearly focused in the incident position 6 on the photosensitive drum 1 and the projected point will move at a constant speed. Then, the light beam is applied through a second mirror 26 and a toroidal lens 27 to the photosensitive drum 1 to effect main scanning thereover while the light beam is being deflected. As the photosensitive drum 1 is rotated, it is scanned also in an auxiliary scanning direction. As a result, an image is written on the photosensitive drum 1 in response to the image information signal, thereby forming an electrostatic latent image on the photosensitive drum 1.

The components of the optical write unit 7 are directly mounted on a base cover 28 of the laser printer.

The electrostatic latent image formed on the photosensitive drum 1 is developed by the developing unit 3 into a toner image, which is then transferred by the transfer charger 4 onto a transfer sheet that has been fed by the pair of resist rollers 11, 12. After the image transfer, the transfer sheet is separated from the photosensitive drum 1, and the image is fixed to the transfer sheet by the fixing unit 13. Then, the transfer sheet is discharged onto the sheet tray 14.

Toner remaining on the photosensitive drum 1 after the image transfer is cleaned away by the cleaning unit 5, making the photosensitive drum 1 ready for a next image forming cycle.

Figure 19:
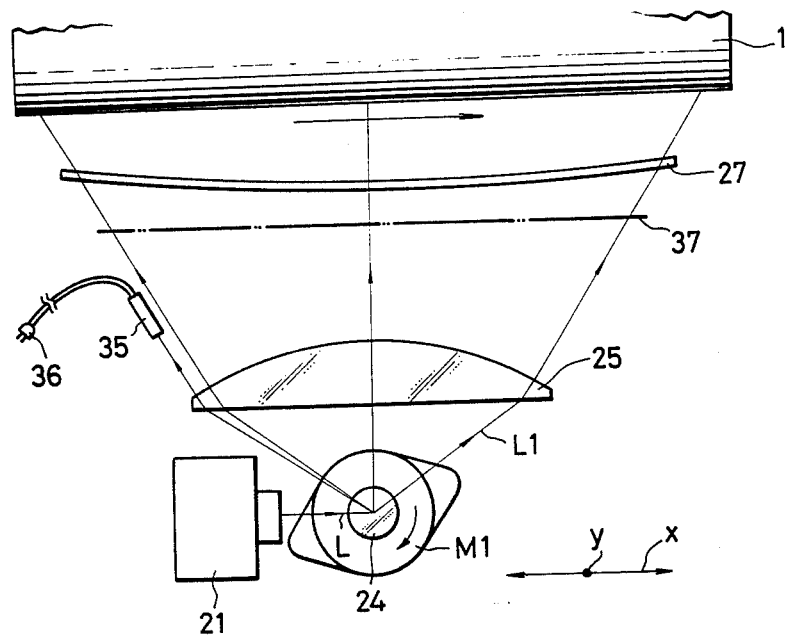
FIGS. 19 and 20 are views of an optical system on an optical path extending from the laser unit to a photosensitive body.
Figure 20:
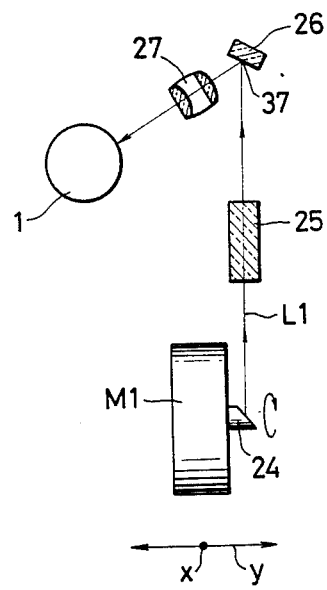

In FIGS. 18, 19, and 20, a laser beam of an elliptical cross section generated by a semiconductor laser 32 as a light source is converted to a parallel-ray beam by a collimator lens 33. Then, the laser beam is shaped by a slit 34 and emitted from the semiconductor laser unit 21.

The laser beam is thereafter applied by the first mirror 22 substantially along the axis of rotation of the unigon mirror 24 to a reflecting surface thereof which is a slanted surface formed by beveling a cylinder.

When the unigon mirror 24 is rotated, the light beam is deflected thereby and directed to the fθ lens 25 by which the projected point is moved at constant speed. Then, the optical axis of the light beam is bent by a reflecting surface 37 of the second mirror 26, whereupon the light beam passes through the toroidal lens 27 and is focused onto the outer peripheral surface of the photosensitive drum 1.

An optical fiber 35 disposed between the fθ lens 25 and the second mirror 26 is connected to a photosensor 36 for extracting synchronizing light to determine a write starting position.

The slit 34 for shaping the light beam before the light beam reaches the unigon mirror 24 is fixed to an immovable member together with the laser unit 21. The slit 34 serves to shape the light beam, passing therethrough, into a light beam having an elliptical cross section.

The elliptical incident light beam L shaped by the slit 34 (see FIG. 18) is reflected by the first mirror 22 and applied to the unigon mirror 24.

Figure 21:
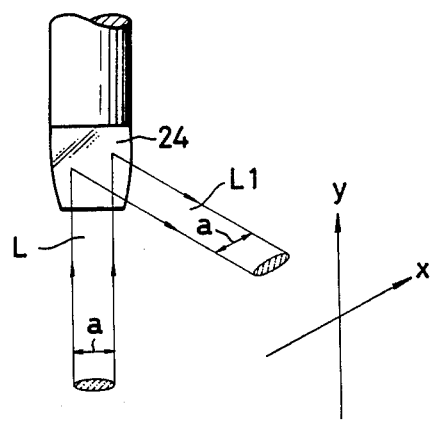
FIG. 21 is a view explanatory of how a light beam is deflected in a desired angular position of a unigon mirror with a shaping means of the present invention being not employed.
Figure 22:
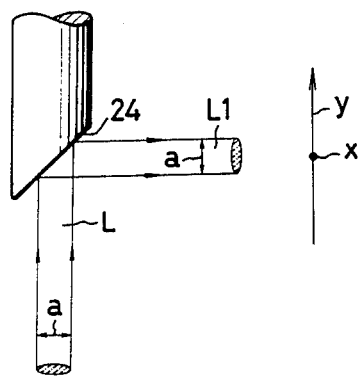
FIG. 22 is a view similar to FIG. 21, showing how the light beam is deflected when the mirror is rotated 90° from the position of FIG. 21.

As illustrated in FIG. 21, in a certain angular position of the unigon mirror 24, the incident light beam L having a major axis diameter a is reflected thereby into an elliptical light beam L1 having a major axis diameter a in an x-axis direction which is a main scanning direction. Since the incident light beam is inclined to a direction normal to the reflecting surface, when the unigon mirror 24 is rotated 90°, the reflected light beam L1 becomes an elliptical light beam having a major axis diameter a in a y-axis direction that is an auxiliary scanning direction perpendicular to the main scanning direction.

The minor axis normal to the major axis is also caused to vary between the x- and y-axis directions. As a result, while the unigon mirror 24 is rotating 90°, the deflected light beam is rotated on the photosensitive drum 1. When the unigon mirror 24 is rotated 90°, the major and minor axes of the elliptical light beam are inverted or switched around between the main and auxiliary scanning directions.

The diameter of a light beam focused by an optical focusing system including the fθ lens, the toroidal lens 27, and the like is determined by the diameter of the beam applied thereto. The diameter of the light beam applied to the lenses varies between the main and auxiliary scanning directions. Therefore, when the diameter of the deflected light beam varies, as described above, the diameter of the final spot on the photosensitive drum surface becomes irregular, resulting in poor image quality.

More specifically, in a light scanning device in which an elliptical light beam is applied to a reflecting surface of a unigon mirror at a finite angle to a direction normal to the reflecting surface for deflecting the light beam, especially where incident and reflecting angles are about 45°, the deflected elliptical light beam is scanned while being rotated by rotation of the unigon mirror, and the spot diameter of the beam focused on the scanned surface by a focusing lens varies between the main and auxiliary scanning directions. As a consequence, the quality of a formed image is impaired.

According to an embodiment of the present invention, to eliminate the above drawback, a synchronous slit for shaping the diameter of an incident light beam toward a focusing lens in a main scanning direction and also the beam diameter in an auxiliary scanning direction is disposed in an optical path integrally with a reflecting surface of a unigon mirror in a position before the light beam is reflected by the reflecting surface, the slit being rotatable with the reflecting surface.

The synchronous slit is defined in one end of a cylindrical slit member which has an exit window or hole defined in an outer peripheral wall thereof and larger than the diameter of the light beam reflected by the light deflector or unigon mirror. The slit member is fitted over the reflecting surface of the light deflector so as to be relatively positioned with respect to the light deflector for rotation therewith.

The size and shape of the incident light beam applied to the synchronous slit are selected such that they are larger than those of the synchronous slit when the synchronous slit is rotated through an effective scanning angle (which is a scanning angle large enough to maintain an effective write width with respect to the photosensitive body).

Figure 23:
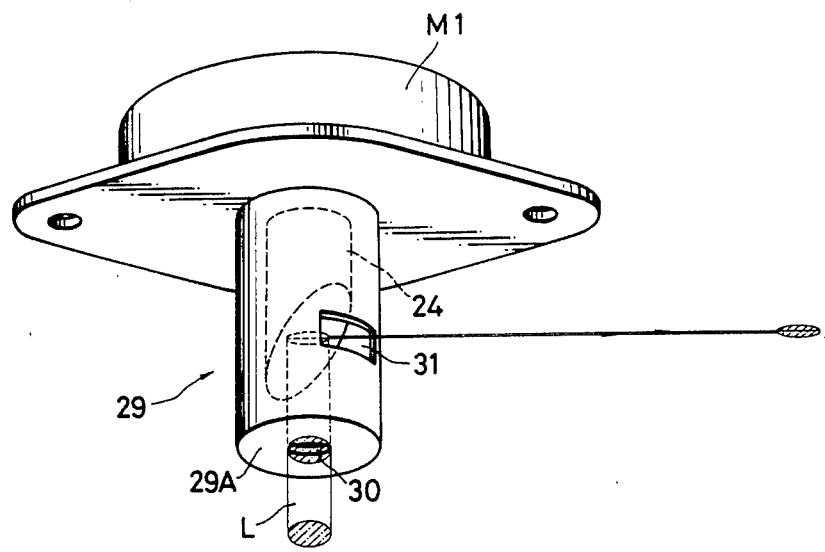
FIG. 23 is a perspective view of an arrangement in which a slit member for shaping a light beam before it is reflected by a reflecting surface is integrally formed with the reflecting surface.

In FIG. 23, a cylindrical slit member 29 is disposed as a shaping means in covering relation to a unigon mirror 24, the slit member 29 being rotatable with the unigon mirror 24. The slit member 29 may be attached to the unigon mirror 24 by being bonded thereto, pressed thereinto, screwed thereto, or any other suitable means.

A synchronous slit 30 of the present invention is defined in an end or bottom 29A of the slit member 29. The synchronous slit 30 has a size smaller than the size of the incident beam L such that the synchronous slit 30 is contained within the diameter of the incident beam at every angular position of the slit 30.

The incident beam L in this embodiment is the same as a conventional laser beam emitted from the laser unit used with the slit 34 (FIG. 18) being not employed. Even with no slit 34 employed, the incident beam L is an elliptical beam.

The slit member 29 has an exit window 31 defined in an outer peripheral wall thereof and having a size sufficiently larger than the diameter of the beam reflected by the unigon mirror 24.

It is assumed that the required beam diameter corresponding to the main scanning direction x is a and the required beam diameter corresponding to the auxiliary scanning direction y is b. The synchronous slit 30 is shaped to match these dimensions of the beam. As shown in FIGS. 24 through 27, more specifically, the incident beam L applied to the synchronous slit 30 is shaped by the slit 30 to an elliptical shape (or oblong shape) having a major axis a and a minor axis b, and the shaped beam is then applied to the reflecting surface of the unigon mirror 24.

Figure 24:
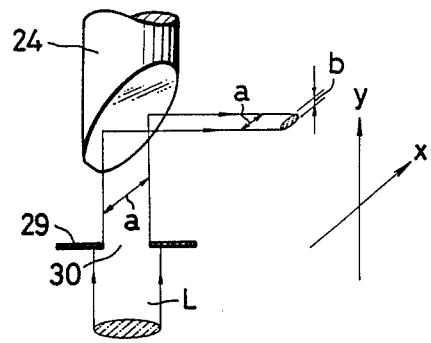
FIG. 24 is a view showing how the light beam is deflected when the reflecting surface is in a certain angular position in FIG. 23.
Figure 25:
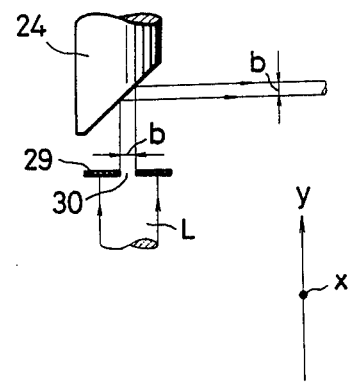
FIG. 25 is a side elevational view of FIG. 24.

As illustrated in FIGS. 24 and 25, the beam reflected by the unigon mirror 24 is of an elliptical shape having beam diameters a, b, and applied to a focusing lens such as an fθ lens which causes a desired spot to be focused on the photosensitive drum 1.

Figure 26:
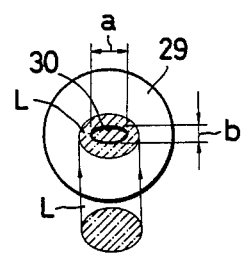
FIG. 26 is a view showing the relationship between an incident light beam and a slit when the slit member is viewed along the axis of rotation in FIG. 23.
Figure 27:
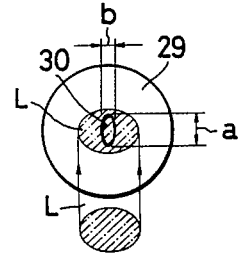
FIG. 27 is a view showing the relationship between the incident beam and the slit when the slit member is rotated 90° from the position of FIG. 26.

FIG. 27 shows the position in which the unigon mirror 24 and the slit member 29 have rotated 90° from the position illustrated in FIGS. 24, 25, and 26.

As shown in FIG. 27, the synchronous slit 30 is also rotated 90° from the position of FIGS. 24 through 26 with respect to the incident beam L. If the synchronous slit 30 were immovable with respect to the reflecting surface, the reflected beam produced by the incident beam L having partly passed through the synchronous slit 30 (FIGS. 24 and 25) and reflected by the reflecting surface would be rotated with respect to the main scanning direction x and the auxiliary scanning direction y. Since the synchronous slit 30 is rotated with the reflecting surface according to the present invention, however, the major and minor axes of the reflected beam remain the same with respect to the main scanning direction x and the auxiliary scanning direction y as those before the unigon mirror 24 and the slit member 29 are rotated 90°. Because this holds true for any angular position of the unigon mirror within 90°, the reflected beam is focused at a desired spot diameter in any position on the scanning line.

Normally, since the effective scanning angle is within +90° (180° in terms of the width in the scanning direction), the spot diameter on the photosensitive body is uniformized and the image quality is good.

The angle of divergence of the beam from the semiconductor laser 32 varies between a direction parallel to the junction surface ($\theta//$) and a direction normal thereto ($\theta\perp$). $\theta//=8°-14°$, and $\theta\perp=20°-36°$. The shape of the incident beam L applied to the synchronous slit 30 is elliptical even if a lens, a prism, or the like is employed.

To shape the elliptical beam with the synchronous slit 30, the incident beam L should be of such a size and a shape as to sufficiently cover the synchronous slit 30 at least while the synchronous slit 30 is being rotated through the effective scanning angle.

If the beam diameter were simply increased, then the ratio of light utilization would be lowered, and required power would not be obtained. This imposes a design limitation.

Therefore, the beam shape and size should be determined on a compromise between the above two considerations.

As another embodiment, rather than employing the cylindrical slit member 29, a channel-shaped plate member having a synchronous slit defined in a central back portion may be disposed in covering relation to the reflecting surface and fixed to the rotatable drive shaft of the unigon mirror.

According to still another embodiment of the present invention, the slit 34 shown in FIG. 18 may be replaced with a circular slit defined in a case. In this arrangement, the slit member 29 is not required.

A further embodiment of the present invention will be described below. In this embodiment, a shaping means is disposed on the optical axis of a reflected light beam.

A synchronous slit for shaping the beam diameter of an incident light beam directed to a focusing lens in a main scanning direction and the beam diameter in an auxiliary scanning direction is disposed on an optical path integrally with a reflecting surface of a light deflector in a position after the light beam is reflected by the reflecting surface, the synchronous slit being rotatable with the reflecting surface.

The synchronous slit is defined in an outer peripheral wall of a cylindrical slit member which has a lower end open across its inside diameter.

Figure 28:
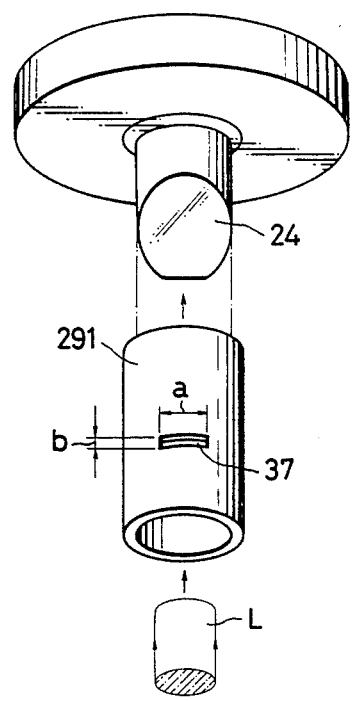
FIG. 28 is a perspective view of an arrangement in which a slit member for shaping a light beam after it is reflected by a reflecting surface is integrally formed with the reflecting surface.
Figure 29:
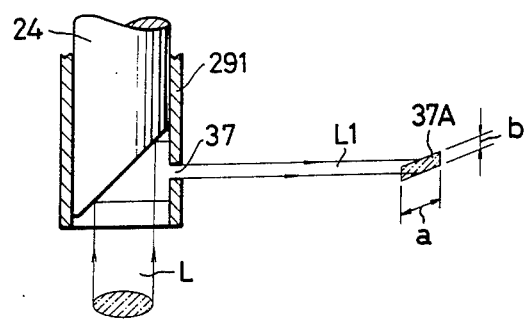
FIG. 29 is a fragmentary cross-sectional view of FIG. 28.

As shown in FIGS. 28 and 29, a cylindrical slit member 291 is fitted over a unigon mirror 24 for rotation therewith. The slit member 291 may be attached to the unigon mirror 24 by being bonded thereto, pressed thereinto, screwed thereto, or any other suitable means. Specific attaching means will be described later on.

A synchronous slit 37 of the present invention is defined in an outer peripheral wall of the slit member 291. The incident beam L in this embodiment is the same as a conventional laser beam emitted from the laser unit used with the slit 34 (FIG. 18) being not employed.

It is assumed that the required beam diameter corresponding to the main scanning direction x is a and the required beam diameter corresponding to the auxiliary scanning direction y is b. The synchronous slit 30 is shaped to match these dimensions of the beam. The slit 30 is defined in a fixed circumferential position in alignment with the direction in which the beam is applied to and reflected by the unigon mirror. As shown in FIGS. 28 and 29, the reflected beam reflected by the unigon mirror 24 toward the synchronous slit 37 is shaped by the slit 37 to an elliptical shape (or oblong shape) having a major axis diameter a and a minor axis diameter b, and the shaped beam is then directed to the f$\theta$ lens 25.

As illustrated in FIG. 29, the beam L1 reflected by the unigon mirror 24 is of an elliptical shape having beam diameters a, b, and applied to a focusing lens such as an f$\theta$ lens which causes a desired spot to be focused on the photosensitive drum 1.

Designated at 37A in FIG. 29 is a beam cross section of the reflected beam L1 emitted from the synchronous slit 37.

Even when the unigon mirror 34 is rotated 90° from an initial position, the beam is shaped in the main and auxiliary scanning directions x, y by the synchronous slit 37 rotating synchronously with the reflecting surface at all times, so that the major and minor axes of the beam remain the same with respect to the main scanning direction x and the auxiliary scanning direction y as those before the unigon mirror 24 and the slit member 29 are rotated 90°. Because this holds true for any angular position of the unigon mirror 24 within 90°, the reflected beam is focused at a desired spot diameter in any position on the scanning line.

Normally, since the effective scanning angle is within ±90° (180° in terms of the width in the scanning direction), the spot diameter on the photosensitive body is uniformized and the image quality is good.

The angle of divergence of the beam from the semiconductor laser 32 varies between a direction parallel to the junction surface ($\theta//$) and a direction normal thereto ($\theta\perp$). $\theta//=8°-14°$, and $\theta\perp=20°-36°$. The shape of the incident beam L applied to the synchronous slit 37 is elliptical even if a lens, a prism, or the like is employed.

To shape the elliptical beam with the synchronous slit 37, the incident beam L should be of such a size and a shape as to sufficiently cover the synchronous slit 37 at least while the synchronous slit 37 is being rotated through the effective scanning angle.

If the beam diameter were simply increased, then the ratio of light utilization would be lowered, and required power would not be obtained. This imposes a design limitation.

Therefore, the beam shape and size should be determined on a compromise between the above two considerations.

A specific means for attaching the slit member 291 to the unigon mirror 24 integral with the motor shaft will be described below with reference to FIGS. 30 and 31.

Figure 30:
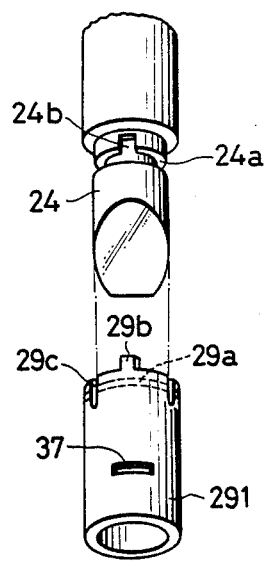
FIG. 30 is a view explaining how the slit member is attached in FIG. 28.

As shown in FIG. 30, the shaft of the unigon mirror 24 has a retaining groove 24a and an angular positioning recess 24b which are defined in a circumferential surface thereof.

The slit member 291 has a ridge 29a on an inner surface of the cylinder thereof, the ridge 29a being engageable in the groove 24a, and also a pin 29b engageable in the recess 24a.

Figure 31:
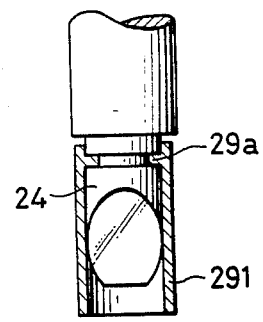
FIG. 31 is a fragmentary cross-sectional view of the attached slit member in FIG. 28.

As illustrated in FIGS. 30 and 31, when the slit member 291 is fitted over the shaft of the unigon mirror 24, the ridge 29a engages in the groove 24a and the pin 29b engages in the recess 24b. The slit member 291 also has axial grooves 29c spaced at intervals for assisting the slit member 291 in flexing when it is fitted over the unigon mirror 24.

As another embodiment, rather than employing the cylindrical slit member 291, a channel-shaped plate member having a synchronous slit defined in a central back portion may be disposed in covering relation to the reflecting surface and fixed to the rotatable drive shaft of the unigon mirror.

According to still another embodiment of the present invention, a shaping means may comprise a slit disposed on the optical axis of a reflected beam and attached to a stationary system separate from the mirror surface of the unigon mirror, the slit being elongate in the main scanning direction for shaping the beam diameter in the auxiliary scanning direction, and a slit being integral with the mirror surface and elongate in the auxiliary scanning direction for shaping the beam diameter in the main scanning direction.

According to a further embodiment of the present invention, the shape of the reflecting surface of a unigon mirror may be substantially elliptical, having an incident beam diameter required for main scanning in the main scanning direction and an incident beam diameter required for auxiliary scanning in the auxiliary scanning direction, the reflecting surface being of at least a size that can be covered by the incident beam applied thereto at all times while the light deflector is being rotated through the effective scanning angle. This embodiment will be described below.

The beam diameter required for main scanning, as referred to above, is a diameter of the incident beam applied to the focusing lens in the main scanning direction, and the beam diameter required for auxiliary scanning, as referred to above, is a diameter of the incident beam applied to the focusing lens in the auxiliary scanning direction.

The effective scanning angle is a scanning angle large enough to maintain an effective write width with respect to the photosensitive body.

In FIGS. 19 and 20, the diameter of the beam applied to the f$\theta$ lens or focusing lens 25 is reduced by the f$\theta$ lens and a following lens before the beam is focused on the photosensitive body. In order to obtain desired spot shape and size on the photosensitive body, the size and shape of the beam immediately before it is applied to the f$\theta$ lens 25 are determined uniquely.

Assuming that the diameter of the beam applied to the f$\theta$ lens 25 is referred to as a beam diameter required for main scanning in the main scanning direction and indicated by A, and the diameter of the beam applied to the f$\theta$ lens 25 is referred to as a beam diameter required for auxiliary scanning in the auxiliary scanning direction and indicated by B, the reflecting surface of the unigon mirror in this embodiment is of an elliptical shape having a size A in the main scanning direction and a size B in the auxiliary scanning direction.

Figure 32:
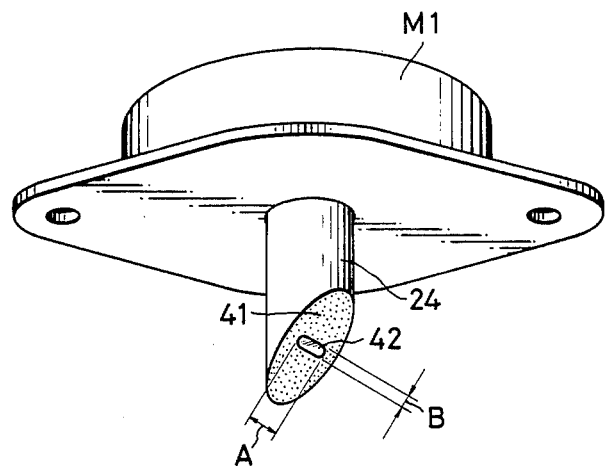
FIG. 32 is a perspective view of a unigon mirror having a beam shaping means provided by limiting the size and shape of the reflecting surface of the unigon mirror.

As shown in FIG. 32, an entire slanted surface 41 of a unigon mirror 24 is not used as a reflecting surface, but a substantially elliptical area in the slanted surface 41, having a dimension A in the main scanning direction and a dimension B in the auxiliary scanning direction is used as a reflecting surface 42, the elliptical area being substantially symmetrical with respect to the axis of rotation of the unigon mirror. The other area of the slanted surface 41 is treated to absorb light or reduce reflected light as by being blackened or coated with a light-absorbing material, and is also treated to scatter applied light as by being roughened.

Figure 33:
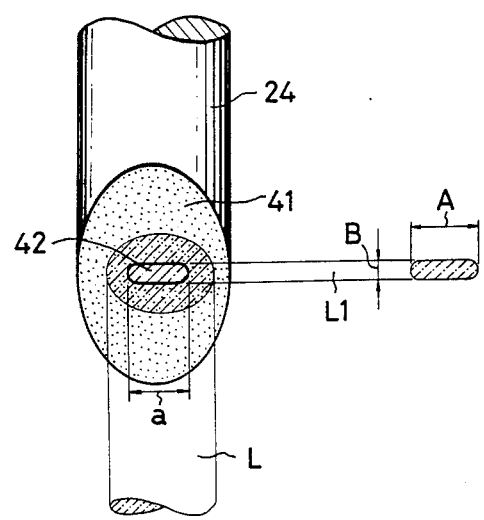
FIG. 33 is a view illustrating the relationship between the reflecting surface and a beam as to size and a reflected beam in FIG. 32.

As shown in FIG. 33, when an incident beam L emitted from the semiconductor laser unit 21 is applied to the unigon mirror 24, light is reflected only by the reflecting surface 42 as a reflected beam L1 having a diameter A in the main scanning direction and a diameter B in the auxiliary scanning direction. The shape and size of the reflected beam L1 remain unchanged within the scanning range insofar as the reflecting surface 42 is covered with the incident beam L.

When the unigon mirror 24 is rotated 90°, for example, the incident beam L which is an elliptical beam is also relatively rotated 90° with respect to the reflecting surface 42. If the minor axis of the elliptical cross-sectional shape of the incident beam L is greater than the major axis of the reflecting surface 42, the size of the reflected beam is kept as the dimension A in the main scanning direction and as the dimension B in the auxiliary scanning direction.

Light applied to the slanted surface 41 outside of the reflecting surface 42 at a level which affects the photosensitive body is not reflected or substantially cut off because the area outside of the reflecting surface 42 is treated to absorb or scatter the light.

According to this embodiment, a light beam having dimensions A×B in the main and auxiliary scanning directions is applied to the f$\theta$ lens 25 at all times, and a uniform spot is focused on the photosensitive body to form an image of good image quality.

As described above, the minor axis of the elliptical cross-sectional shape of the incident beam L is required to be equal to or greater than the major axis of the reflecting surface 42 when the unigon mirror 24 is rotated 90°. This holds true when the unigon mirror 24 is rotated 90° in the opposite direction. Therefore, provided that the minor axis of the incident beam L is greater than the major axis of the reflecting surface 42, light can be deflected 180° while its dimensions in the main and auxiliary directions remain A×B.

In reality, the 180° light deflection is not necessary, and hence the incident beam L may cover the reflecting surface 42 at all times at least when the unigon mirror 24 is rotated the effective scanning angle.

In view of light utilization efficiency, however, the incident beam L should be of a small diameter while meeting the above conditions.

The reflecting surface may also be of other structures as described below.

Figure 34:
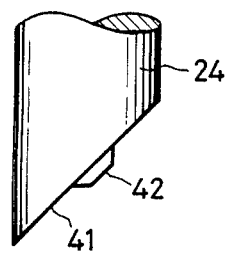
FIGS. 34 through 37 are views of unigon mirrors having reflecting surfaces doubling as beam shaping means.

In FIG. 34, only a reflecting surface 42 is raised or convex. The reflecting surface 42 can be machined after the other slanted surface 41 is treated so as to absorb or scatter light.

Figure 35:
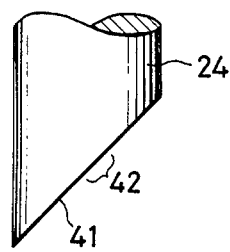

In FIG. 35, slanted and reflecting surfaces 41, 42 lie flush with each other. The other area than the reflecting surface 42 is masked when the reflecting surface 42 is processed into a mirror surface by evaporation, and the reflecting surface 42 is masked when the other area is treated so as to absorb or scatter light.

Figure 36:
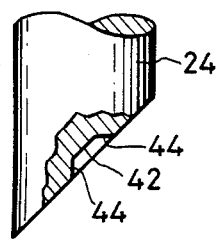

In FIG. 36, a reflecting surface 42 is recessed or concave and has a inclined edges 44 directed not to obstruct travel of an incident beam L. In this embodiment, the reflecting surface 42 is protected during manufacture and assembly.

Figure 37:
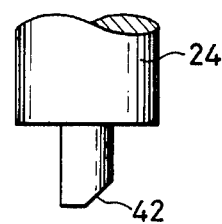

FIG. 37 shows an embodiment which is an improvement over the embodiment of FIG. 34. In this embodiment, an unwanted portion is cut off leaving the reflecting surface 42.

In each of the above embodiments, the base material of the unigon mirror 24 may be resin, or the unigon mirror 24 may be made of an Al-, SUS-, or Cu-base material.

Although not shown, if the surface treatment for light absorption or scattering is not sufficiently effected technically, the other surface than the reflecting surface 42 may be angled in order to eliminate light returning to the semiconductor laser unit 21 and direct reflected light in other than the scanning direction, so that light is reflected only by the reflecting surface 42.

The unigon mirror 24 may be formed by machining the rotatable shaft of the motor M1, or may be pressed into, bonded to, or otherwise integrally attached thereto.

As another embodiment of the present invention, a shaping means may comprise slits disposed respectively on the optical axes of incident and reflected beams.

These slits are arranged for rotation with a unigon mirror as described in the following embodiment:

A circular slit having the same diameter as a larger diameter of an incident beam directed toward a focusing lens in the main scanning direction is placed in a position before the beam is deflected by a light deflector, and an oblong slit having a minor axis which is the same as a smaller diameter of the beam and a major axis which is equal to or larger than the diameter of the circular slit is placed in a position after the beam is deflected by the light deflector and prior to the focusing lens, the slits being rotatable with the reflecting surface of the light deflector.

The circular slit is defined in one end of a cylindrical slit member, and the oblong slit is defined in an outer peripheral wall thereof. By fitting the slit member over the reflecting surface of the light deflector, the slit member is relatively positioned with respect to the light deflector and made rotatable with the reflecting surface.

The size and shape of the incident beam applied to the slits are selected to be greater than at least those of the slits when the slits are rotated through the effective scanning angle (a scanning angle which is large enough to maintain an effective write width with respect to the photosensitive body).

Figure 38:
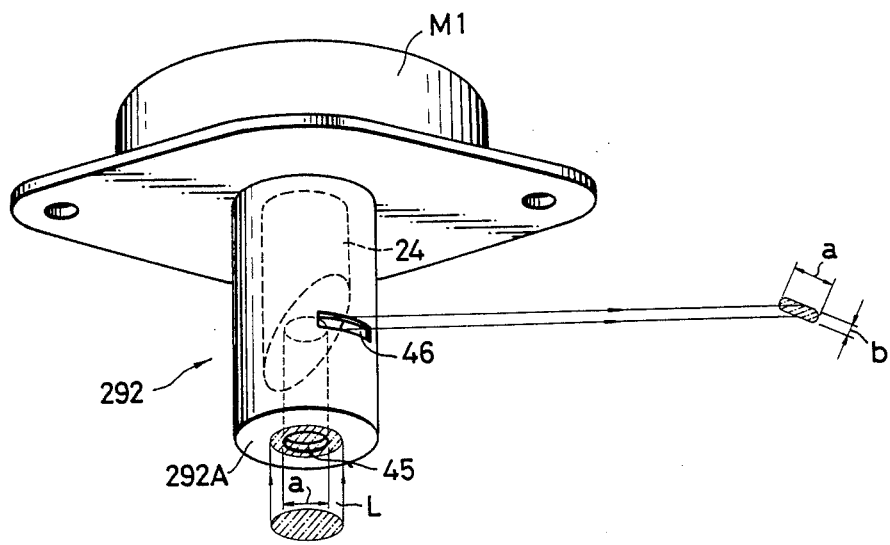
FIG. 38 is a perspective view of an arrangement in which a slit member for shaping a light beam before and after it is reflected by a reflecting surface is integrally formed with the reflecting surface.

In FIG. 38, a cylindrical slit member 292 is fitted over a unigon mirror 24 for rotation therewith. The slit member 292 may be attached to the shaft of the unigon mirror 24 by being bonded, pressed, or screwed.

A circular slit 45 according to this embodiment is defined in one end or bottom 292A of the slit member 292.

Assuming that the beam applied to the $f\theta$ lens or focusing lens 25 has a beam diameter a in the main scanning direction x and a beam diameter b in the auxiliary scanning direction y normal to the main scanning direction x ($a \geqq b$), the diameter of the circular slit 45 is equal to the beam diameter a.

The slit member 292 also has an oblong slit 46 defined in an outer peripheral wall thereof.

The oblong slit 46 is an elliptical hole having a circumferential direction corresponding to the main scanning direction x and an axial direction corresponding to the auxiliary scanning direction y. The elliptical hole has a minor axis along the auxiliary scanning direction y, equal to the dimension b which is the required beam diameter for auxiliary scanning, and a major axis along the main scanning direction x, equal to or greater than the dimension a.

The incident beam L in this embodiment is the same as a conventional laser beam emitted from the laser unit used with the slit 34 (FIG. 18) being not employed.

Shaping and reflection of the beam in the main scanning direction x using the slit member 292 will be described below with reference to FIG. 39.

The beam emitted from the semiconductor laser 32 in the laser unit 21 shown in FIG. 18 is converted to a parallel-ray elliptical beam by the collimator lens 33, and the parallel-ray elliptical beam is reflected by the first mirror 22 as an incident beam L toward the unigon mirror 24.

As shown in FIG. 39, the incident beam L is then cut off or shaped by the circular slit 45 into a beam having a beam diameter a in the main scanning direction x. After the beam has been reflected by the unigon mirror 24, it passes through the oblong slit 46. Since the diameter of the oblong slit 46 in the main scanning direction x is equal to or greater than the beam diameter a, as described above, the diameter of the beam applied to the $f\theta$ lens 25 remains a in the main scanning direction x.

Shaping and reflection of the beam in the auxiliary scanning direction y will be described below with reference to FIG. 40.

The beam of a circular cross section from the circular slit 45 is directed toward the unigon mirror 24. The beam is then reflected by the unigon mirror 24 toward the oblong slot 46. Inasmuch as the size of the oblong slit 46 in the auxiliary scanning direction y is the same as the required beam diameter b of the beam to be applied to the $f\theta$ lens 25, the diameter of the beam having passed through the oblong slit 46 becomes b in the auxiliary scanning direction y. As a consequence, an elliptical light beam having the diameter a in the main scanning direction and the diameter b in the auxiliary scanning direction is applied to the $f\theta$ lens 25 which focuses a spot of desired size and shape on the scanned surface of the photosensitive drum 1.

The slit member 292 having the circular slit 45 and the oblong slit 46 is rotatable with the unigon mirror 24 as described above. Therefore, as the unigon mirror 24 is rotated to deflect the applied incident beam, the beam conditions are kept as shown in FIGS. 39 and 40 at all times, and the beam is focused at a desired spot diameter in any position on the scanning line.

The angle of divergence of the beam from the semiconductor laser 32 varies between a direction parallel to the junction surface ($\theta//$) and a direction normal thereto ($\theta\perp$). $\theta// = 8° - 14°$, and $\theta\perp = 20° - 36°$. The shape of the incident beam L applied to the circular slit 45 is elliptical even if a lens, a prism, or the like is employed.

To shape the elliptical beam with the rotatable elliptical slit composed of the circular slit 45 and the oblong slit 46, the incident beam L should be of such a size and a shape as to sufficiently cover the rotatable elliptical slit at least while the rotatable elliptical slit is being rotated through the effective scanning angle.

If the beam diameter were simply increased, then the ratio of light utilization would be lowered, and required power would not be obtained. This imposes a design limitation.

Therefore, the beam shape and size should be determined on a compromise between the above two considerations.

By employing the slit member 292 (FIG. 38) in the laser unit shown in FIG. 18 with the slit 34 removed, an image of uniform image quality can be formed.

According to a still further embodiment, a shaping means comprises slits disposed on the optical axis of an incident beam and mounted on a stationary system separate from a unigon mirror.

More specifically, in the following embodiment, a circular slit for shaping the incident beam to be applied to a focusing lens, in the main scanning direction is placed in a position before the beam is reflected by the unigon mirror, and an elongate slit having an opening extending beyond the entire scanning angle for shaping the beam in the auxiliary scanning direction normal to the main scanning direction is placed in a position after the beam is reflected by the unigon mirror, the elongate slit extending along the main scanning direction between the unigon mirror and the focusing lens.

Figure 41:
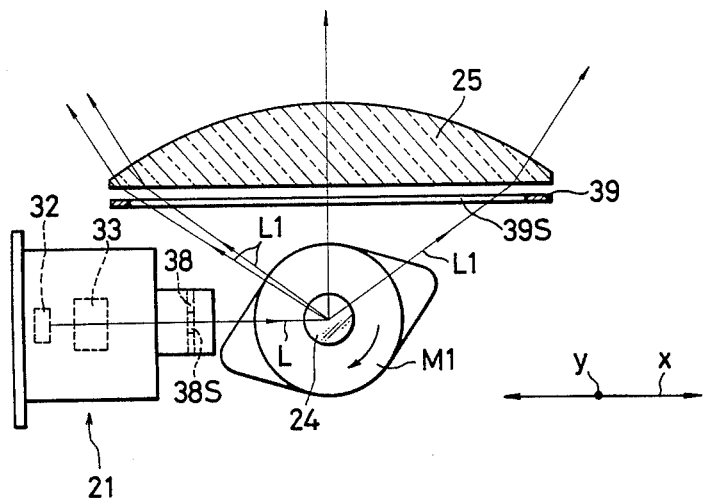
FIG. 41 is a view of an arrangement in which slit members are attached to a stationary system separate from a reflecting surface for shaping a light beam before and after it is reflected by the reflecting surface.

As shown in FIG. 41, a slit member 38 has a circular slit 38S having the same diameter as the diameter of the beam to be applied to the fθ lens 25, in the main scanning direction x, the slit member 38 being positioned in place of the slit 34 shown in FIG. 18 on the optical axis prior to the unigon mirror 24.

Figure 43:
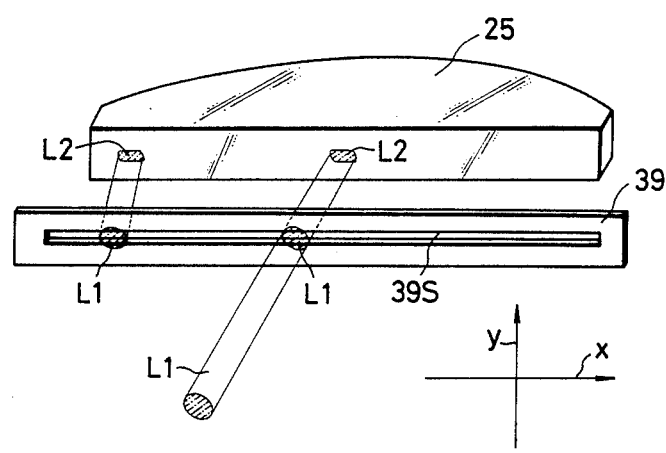
FIG. 43 is a perspective view of FIG. 42.
Figure 42:
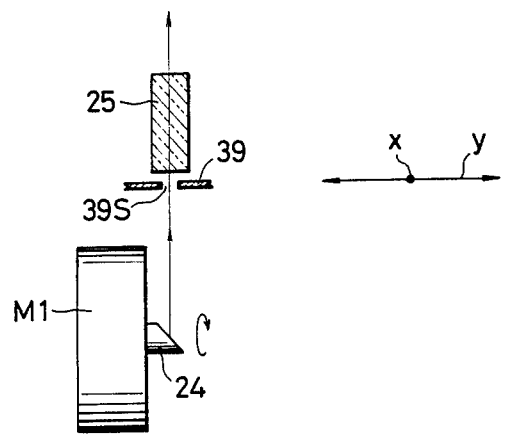
FIG. 42 is a view of the slit member for shaping the light beam after it is reflected by the reflecting member in FIG. 41.

As illustrated in FIGS. 41 through 43, a slit member 39 having an elongate slit 39S is disposed between the unigon mirror 24 and the fθ lens 25 with the longitudinal direction of the slit 39S being along the main scanning direction x.

The width of the elongate slit 39S is selected to match the required beam diameter in the auxiliary scanning direction y, and the length of the elongate slit 39S is over the entire scanning angle to meet the required scanning length of the beam.

With this arrangement, even when the unigon mirror 24 is rotated, the diameter of the beam reflected by the unigon mirror in the main scanning direction toward slit member 39 remains the same since the incident beam applied to the unigon mirror 24 is shaped to a circular configuration by the circular slit 38S.

As shown in FIG. 43, the reflected beam L1 going toward the slit member 39 is shaped in the auxiliary scanning direction y by the elongate slit 39S, and then directed toward the fθ lens 25 as an incident beam L2 which keeps uniform beam diameters in the main and auxiliary scanning directions x, y at all times, so that a desired uniform spot is focused on the photosensitive drum 1 to increase the image quality.

The slit 39S may be positioned anywhere between the unigon mirror 24 and the fθ lens 25 on the optical axis. If the slit 39S is closer to the unigon mirror 24, the width of the slit in the main scanning direction may be made smaller, and the slit 39S may be attached with greater freedom. Conversely, the accuracy with which the slit is to be attached in place for ensuring the focused position on the photosensitive drum 1 becomes more stringent. An optimum position for the slit 39S is thus determined in view of these considerations.

According to a yet still further embodiment, a shaping means comprises slits disposed respectively on the optical axis of an incident beam and the optical axis of a reflected beam, and mounted on a stationary system separate from a unigon mirror.

In this embodiment, a circular slit having the same diameter as a diameter of an incident beam directed toward a focusing lens, in the main scanning direction is placed in a position before the beam is reflected by the reflecting surface of a light deflector, and a rectangular slit having a size which is the same as a diameter of the beam in the auxiliary scanning direction and a dimension in the main scanning direction which is capable of at least allowing a synchronizing light beam to pass therethrough and scanning an angular range equal to or greater than the effective scanning angle, is placed in a position after the beam is reflected by the reflecting surface of the light deflector, these circular and rectangular slits being mounted on a stationary system separate from the reflecting surface.

The circular slit is defined in one end of a cylindrical slit member, and the rectangular slit is defined in an outer peripheral wall thereof. By fitting the slit member over the reflecting surface of the unigon mirror and fixing the slit member to the stationary system, the slit member is relatively positioned with respect to the unigon mirror.

The size and shape of the incident beam are selected to cover an elliptical shape formed jointly by the above two slits when the slit member is rotated through the effective scanning angle (a scanning angle which is large enough to maintain an effective write width with respect to the photosensitive body) and a synchronizing light beam angle.

Figure 44:
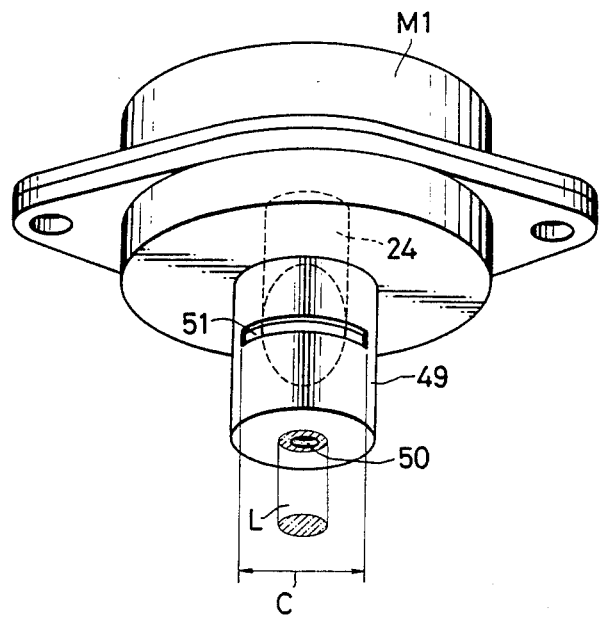
FIG. 44 is a view of another arrangement in which slit members are attached to a stationary system separate from a reflecting surface for shaping a light beam before and after it is reflected by the reflecting surface.
Figure 45:
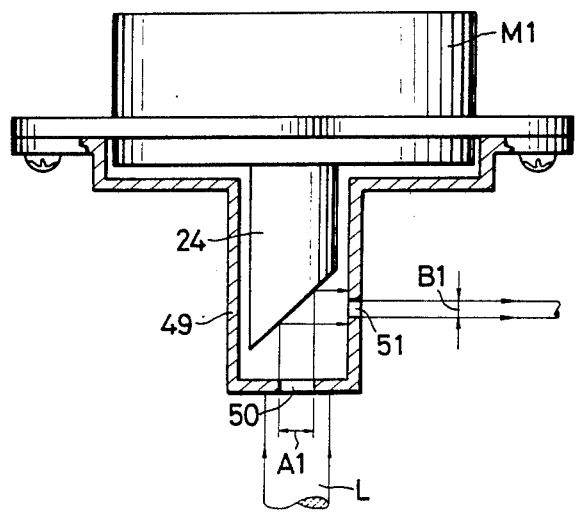
FIG. 45 is a cross-sectional view of FIG. 44.

In FIGS. 44 and 45, a cylindrical slit member 49 is fitted over a unigon mirror 24, and mounted on a frame of a motor M1, for example, so that the slit member 49 remains still with respect to the rotating unigon mirror 24.

The slit member 49 has a circular slit 50 defined in a bottom thereof. The circular slit 50 has a size Al which is the same as the diameter a in the main scanning direction of the reflected beam L1 (see FIGS. 19 and 20) applied to the fθ lens or focusing lens 25, the circular slit 50 having a center substantially coaxial with the center of rotation of the unigon mirror 24.

The slit member 49 also has a rectangular slit 51 defined in an outer peripheral wall thereof in confronting relation to the reflecting surface of the unigon mirror 24.

The rectangular slit 51 has an opening having a dimension B1 which is the same as the diameter in the auxiliary scanning direction of the reflected beam L1 (see FIGS. 19 and 20) applied to the fθ or focusing lens 25, the slit 51 being defined in the auxiliary scanning direction or axial direction of the unigon mirror 24. The opening of the rectangular slit 51 also has a dimension C in the main scanning direction normal to the auxiliary scanning direction, the dimension C being capable of at least allowing a synchronizing light beam for determining a start of optical writing operation, i.e., a light beam to be applied to the optical fiber 35 (FIG. 19) to pass therethrough, and of scanning an angular range equal to or greater than the effective scanning angle.

The rectangular slit 51 is directed in the light scanning direction (in the direction of the photosensitive body) and is arranged at least to permit light to reach the optical fiber 35 and also permit light to traverse the exposure width of the photosensitive body.

Denoted at L in FIGS. 44 and 45 is a light beam before it reaches the slit member 49.

The beam L emitted from the semiconductor laser unit 21 is converted by the circular slit 50 to a circular beam having a diameter A1 which is then reflected by the unigon mirror 24.

Thereafter, the circular beam is shaped by the rectangular slit 51 into a beam having a width B1 in the auxiliary scanning direction.

When the unigon mirror 24 is rotated to scan the light beam, the beam has the dimension A1 in the main scanning direction and the dimension B1 in the auxiliary scanning direction.

Therefore, the beam diameters in the main and auxiliary scanning directions of the light beam applied to the fθ lens 25 remain constant during light scanning operation, thus forming a uniform spot on the photosensitive body surface and improving the quality of an image formed.

Figure 46:
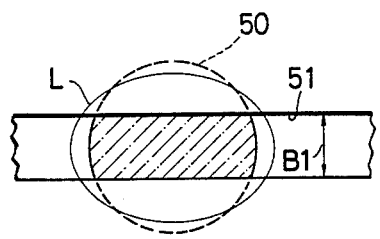
FIGS. 46 and 47 are views of beam configurations shaped by two slits in FIG. 44.
Figure 47:
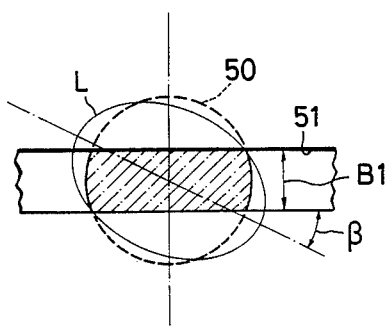

As illustrated in FIGS. 46 and 47, the size of the incident beam L should be such that it covers at least the combined slit comprising the circular slit 50 and the rectangular slit 51 when the beam is rotated by the unigon mirror 24 through the effective scanning angle and the synchronizing light beam angle β. With this arrangement, the diameter of the beam having passed through the combined slit is made uniform. The shaded area in FIGS. 46 and 47 represents a slit region formed by the circular slit 50 and the rectangular slit 51.

Light emitted from the semiconductor laser 32 normally has different divergent angles between directions parallel and normal to the activated layer of the semiconductor laser 32. The light beam from the semiconductor laser 32 is of an elliptical cross section even after it is shaped by a lens.

In order to shape the laser beam into a circular laser beam, a considerable number of lenses and prisms are required resulting in a cost increase. For this reason and to reduce vignetting of light due to the slits or increase the light utilization efficiency, the elliptical shape should be as small as possible.

As described above, the image quality can be improved by employing the slit member shown in FIGS. 44 and 45 in place of the slit 34 of FIG. 18.

In carrying out the present invention, the angle of inclination of the unigon mirror to the axis of rotation is not limited to 45°.

Although certain preferred embodiments have been shown and described, it should be understood that many changes and modifications may be made therein without departing from the scope of the appended claims.

What is claimed is:

1. A light scanning device comprising a mirror surface inclined to an axis of rotation for deflecting and scanning an incident beam of a nearly elliptical cross-section applied across the axis of rotation over a scanning line in a main scanning direction in response to rotation of said mirror surface, and shaping means for shaping the nearly elliptical cross-section of said incident beam in order to prevent its direction from being changed on the scanning line irrespective of the rotation of said mirror surface, wherein said scanning line is applied to a photosensitive member and wherein a focusing lens is positioned between said shaping means and said photosensitive member.

2. A light scanning device according to claim 1, wherein said shaping means comprises a slit disposed on the optical axis of the incident beam.

3. A light scanning device according to claim 2, wherein said slit is integral with the mirror surface for rotation therewith and shaped for shaping the beam with respect to beam diameters in main and auxiliary scanning directions.

4. A light scanning device according to claim 3, wherein said slit is a substantially elliptical shape elongate in the auxiliary scanning direction.

5. A light scanning device according to claim 2, wherein said slit is mounted on a stationary system separate from the mirror surface and has a circular shape for shaping the beam in its entirety.

6. A light scanning device according to claim 2, wherein said slit is integral with the mirror surface for rotation therewith and shaped for shaping the beam with respect to beam diameters in the main scanning direction and an auxiliary scanning direction normal to the main scanning direction.

7. A light scanning device according to claim 6 wherein said slit is one of an elliptical and elongate shape which is elongate in the main scanning direction.

8. A light scanning device according to claim 2, wherein said slit is mounted on a stationary system separate from the mirror surface and includes a slit elongate in the main scanning direction for shaping the beam with respect to a beam diameter in the auxiliary scanning direction, and a slit integral with the mirror surface and elongate in the auxiliary scanning direction for shaping the beam with respect to a beam diameter in the main scanning direction.

9. A light scanning device according to claim 1, wherein said shaping means is provided by selecting a size and a shape for the mirror surface, said mirror surface comprising a reflecting surface contained in the diameter of the incident beam within an angular range (effective scanning angle) required for effective scanning over a scanning line length.

10. A light scanning device according to claim 9, wherein said mirror surface is of an elliptical shape having a major axis in the main scanning direction.

11. A light scanning device according to claim 1, wherein said shaping means comprises a slit disposed on the optical axis of the incident beam and a slit disposed on the optical axis of a beam reflected by the mirror surface.

12. A light scanning device according to claim 11, wherein said slits are integral with said mirror surface for rotation therewith.

13. A light scanning device according to claim 12, wherein the slit disposed on the optical axis of the incident beam is of a circular shape, and the slit disposed on the optical axis of the reflected beam is an oblong hole elongate in the main scanning direction.

14. A light scanning device according to claim 11, wherein said slits are mounted on a stationary system separate from said mirror surface.

15. A light scanning device according to claim 14, wherein the slit disposed on the optical axis of the incident beam is of a circular shape for shaping the beam with respect to a beam diameter in the main scanning direction, and the slit disposed on the optical axis of the reflected beam is an oblong hole elongate in the main scanning direction for shaping the beam with respect to beam diameter in the auxiliary scanning direction.

16. A light scanning device according to claim 15, wherein said slits are defined in a cylindrical slit member fitted over the mirror surface with a clearance therebetween which is large enough to allow the mirror surface to rotate.

* * * * *